(12) United States Patent
Chen et al.

(10) Patent No.: US 9,354,995 B2
(45) Date of Patent: May 31, 2016

(54) METHOD FOR CONTROLLING OPERATIONS OF SERVER CLUSTER

(71) Applicant: Synology Incorporated, Taipei (TW)

(72) Inventors: Kan-Yueh Chen, Taoyuan County (TW); Jia-Yu Liu, New Taipei (TW)

(73) Assignee: Synology Incorporated, Taipei (TW)

( * ) Notice: Subject to any disclaimer, the term of this patent is extended or adjusted under 35 U.S.C. 154(b) by 74 days.

(21) Appl. No.: 14/451,438

(22) Filed: Aug. 5, 2014

(65) Prior Publication Data
US 2015/0143157 A1    May 21, 2015

(30) Foreign Application Priority Data

Nov. 19, 2013    (TW) .............................. 102142109 A

(51) Int. Cl.
*G06F 11/20* (2006.01)
*H04L 29/14* (2006.01)
*H04L 29/08* (2006.01)

(52) U.S. Cl.
CPC .............. *G06F 11/203* (2013.01); *H04L 67/10* (2013.01); *H04L 67/1034* (2013.01); *H04L 69/40* (2013.01); *H04L 67/1048* (2013.01)

(58) Field of Classification Search
CPC ............ G06F 11/2035; G06F 11/2028; G06F 11/2007; G06F 11/2046
See application file for complete search history.

(56) References Cited

U.S. PATENT DOCUMENTS

| | | | |
|---|---|---|---|
| 6,801,949 B1 * | 10/2004 | Bruck et al. | 709/232 |
| 7,818,408 B1 | 10/2010 | Ignatuk | |
| 8,055,933 B2 | 11/2011 | Jaehde | |
| 2002/0184376 A1 * | 12/2002 | Sternagle | 709/230 |
| 2006/0221815 A1 | 10/2006 | Matsumoto | |
| 2006/0294207 A1 | 12/2006 | Barsness | |

FOREIGN PATENT DOCUMENTS

TW    I387884    3/2013

* cited by examiner

*Primary Examiner* — Jigar Patel
(74) *Attorney, Agent, or Firm* — Winston Hsu; Scott Margo

(57) ABSTRACT

A server cluster has a plurality of application servers. During failover of a failed node of the application servers, right to use of internet protocol (IP) address of the failed node is transferred to a surviving node of the server cluster according to a failed-link index of the failed node, the total number of surviving nodes of the server cluster, and successful link indexes of the surviving nodes.

6 Claims, 10 Drawing Sheets

METHOD FOR CONTROLLING OPERATIONS OF SERVER CLUSTER

BACKGROUND OF THE INVENTION

1. Field of the Invention

The present invention relates to a method for controlling operations of a server cluster, and more specifically, to a method for performing failovers among a plurality of application servers of a server cluster.

2. Description of the Prior Art

A client/server architecture may be used to implement many internet services. In a modern client/server environment, the server side may group together a plurality of application servers to form a server cluster and each application server may be viewed as a node of the server cluster. The server cluster may be viewed by each client as a single server. For an ideal server cluster, each node (i.e. each application server) shall evenly process the network service requests received from the clients. However, when an application server fails, in order to avoid service interruption, failover may be performed on the failed application server. After the application server has been repaired, failback may then be performed.

SUMMARY OF THE INVENTION

An embodiment of the present invention presents a method of controlling operations of a server cluster. The server cluster comprises m application servers. The method comprises setting surviving nodes of the m application servers to successful-link indexes of different values, setting failed nodes of the m application servers to failed-link indexes of different values, and transferring right to use of an internet protocol (IP) address of an $s^{th}$ application server to a $t^{th}$ application server of the m application servers according to a failed-link index of the $s^{th}$ application server, the number of the surviving nodes of the m application servers, and a successful-link index of each of the surviving nodes when the $s^{th}$ application server of the m application servers is a failed node and failover is performed on the $s^{th}$ application server where m>1, m≥s>0, m≥t>0, and m, s, and t are positive integers.

The method of controlling operations of the server cluster in the embodiment of the present invention, a non-coordinated architecture is used to perform the failover. Each node of the server cluster has equal status and need not have a master node responsible for coordinating during failover alike a coordinated architecture. Each of the plurality of application servers may perform failover or failback according to the present status of the server cluster. During failover, the failover mode is determined according to the present status of the server cluster to prevent overloading of a single node. Furthermore, during failover, dynamic load balancing may be performed to prevent overloading of a single node. In addition, no two nodes of the server cluster will perform failover of the same failed node, ensuring the stability of the server cluster.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
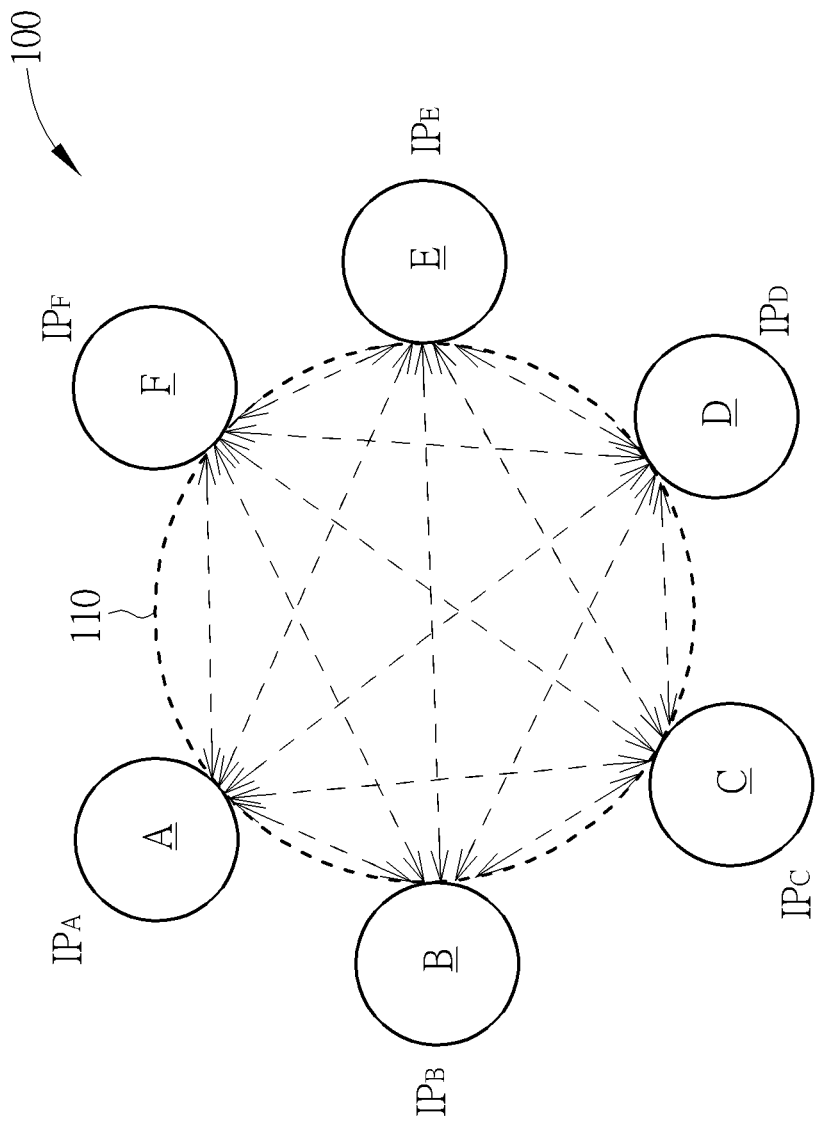
FIG. 1 illustrates a block diagram of a server cluster according to an embodiment of the present invention.
Figure 2:
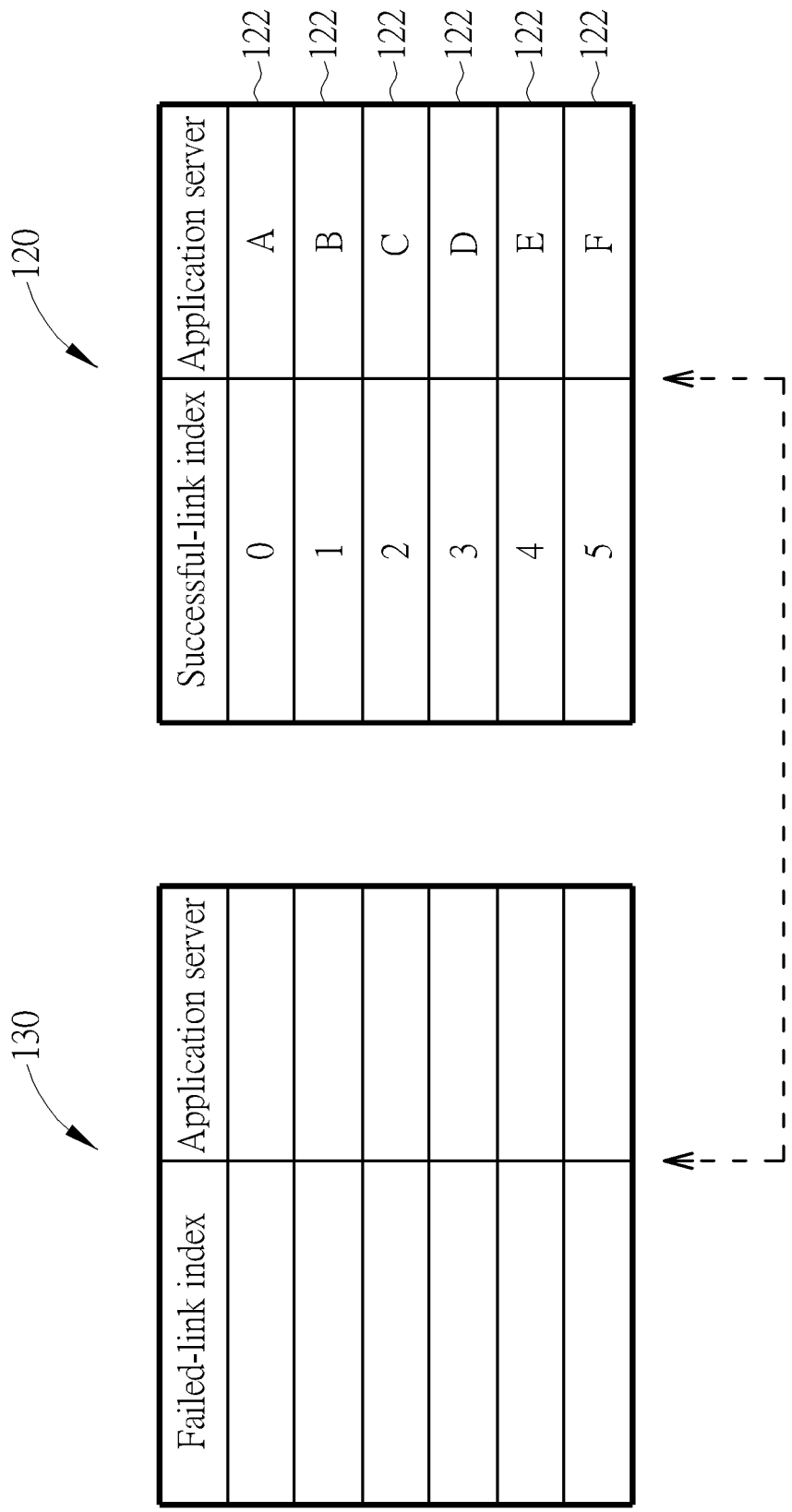
FIG. 2 illustrates the surviving node table and the failed node table of the server cluster in FIG. 1.

Please refer to FIG. 1. FIG. 1 illustrates a block diagram of a server cluster 100 according to an embodiment of the present invention. The server cluster 100 comprises a plurality of application servers A to F. The application servers A to F may be linked to each other through the network 110. The server cluster 100 uses a non-coordinated architecture to perform failover and failback among the application servers A to F. Each of the plurality of application servers A to F may be viewed as a node of the server cluster 100. Each of the plurality of application servers A to F may periodically check the state of each of the plurality of application servers A to F of the server cluster 100 and the state of each of the plurality of application servers A to F may generate a surviving node table 120 and a failed node table 130 in FIG. 2. The surviving node table 120 may be used to record which application servers among the plurality of application servers A to F may normally provide service and the failed node table 130 may be used to record which application servers among the plurality of application servers A to F may not be able to normally provide service. In the following description, each application server able to normally provide service may be referred to as a surviving node and each application server not able to normally provide service may be referred to as a failed node. Note that, although the embodiment only uses six application servers A to F for the description, the present invention is not limited to having only six application servers A to F. The method of operation of the present invention may comprise a server cluster having two or more application servers.

The plurality of application servers A to F may use internet protocol addresses $IP_A$ to $IP_F$ to receive network service requests from the clients and provide network service to the clients. The application servers A, B, C, D, E, and F respectively use internet protocol addresses $IP_A$, $IP_B$, $IP_C$, $IP_D$, $IP_E$, and $IP_F$. In an embodiment of the present invention, sequence of the plurality of application servers A to F may be set according to the internet protocol addresses $IP_A$ to $IP_F$. For example, in the embodiment, because internet protocol addresses $IP_A$<$IP_B$<$IP_C$<$IP_D$<$IP_E$<$IP_F$, the sequence of the plurality of application servers A to F may be set at A→B→C→D→E→F. However, setting the sequence of the plurality of application servers A to F is not limited to being based on the internet protocol addresses $IP_A$ to $IP_F$. The sequence of the plurality of application servers A to F may be set according to other relevant data. For example, the sequence of the plurality of application servers A to F may be set according to media access control (MAC) address of each of the plurality of application servers A to F. Furthermore, the sequence of the plurality of application servers A to F may set according to manual setting of each of the plurality of application servers A to F. Since each of the plurality of application servers A to F may use the same rule in setting the sequence of the plurality of application servers A to F, there would be a consistency in sequence set by each of the plurality of application servers A to F. Furthermore, each of the plurality of application servers A to F may generate the surviving node table 120 and the failed node table 130 according to the sequence set and each of the plurality of application servers A to F may periodically update the surviving node table 120 and the failed node table 130 such that the surviving node table 120 and the failed node table 130 may reflect the real-time status of each of the plurality of application servers A to F. Since there is a consistency in sequence of the plurality of application servers A to F, the surviving node table 120 and the failed node table 130 generated by each surviving node may be the same. As for a failed node, a problem in the network connectivity may have an impact on the accuracy of the surviving node table 120 and the failed node table 130. Therefore, the surviving node table 120 and the failed node table 130 of the failed node may not be used until error of the failed node is repaired and become a surviving node having the surviving node table 120 and the failed node table 130 updated.

The following is a description of the function of the surviving node table 120 and the failed node table 130. Taking FIG. 1 and FIG. 2 as an example, because all of the plurality of application servers A to F are able to normally provide network service, each of the application servers A to F may be recorded as a surviving node in the surviving node table 120 and no failed node will be recorded in the failed node table 130. And the sequence of successful link data 122 recorded in the surviving node table 120 may be A→B→C→D→E→F. Furthermore, the surviving node table 120 may comprise a plurality of pieces of successful link data 122. Each piece of the successful link data 122 corresponds to a surviving node and a successful-link index corresponding to the surviving node. Taking the case of FIG. 1 and FIG. 2 as an example, because all six of the application servers A to F are surviving nodes, the surviving node table 120 may record six pieces of successful link data 122 and the successful-link indexes corresponding to the application servers A to F may be 0 to 5. Because the internet protocol address $IP_A$ of the application server A is first in the sequence, the successful-link index thereof is lowest; and because the internet protocol address $IP_F$ of the application server F is last in the sequence, the successful-link index thereof is highest. The above mentioned method of generating each of the plurality of pieces of successful link data 122 by using the surviving node table 120 may also apply to other server clusters having a different number of application servers. For example, if the server cluster 100 has m application servers, under the condition that the m application servers are surviving nodes, the surviving node table 120 may record m pieces of successful link data 122 and the successful-link indexes corresponding to the m application servers may be 0 to (m−1), where m is greater than one. The successful-link index of each of the plurality of pieces of successful link data 122 may be used as a basis for conducting failover. The following description will further discuss on how the successful-link index of each piece of successful link data 122 may be used as a basis for conducting failover.

Figure 3:
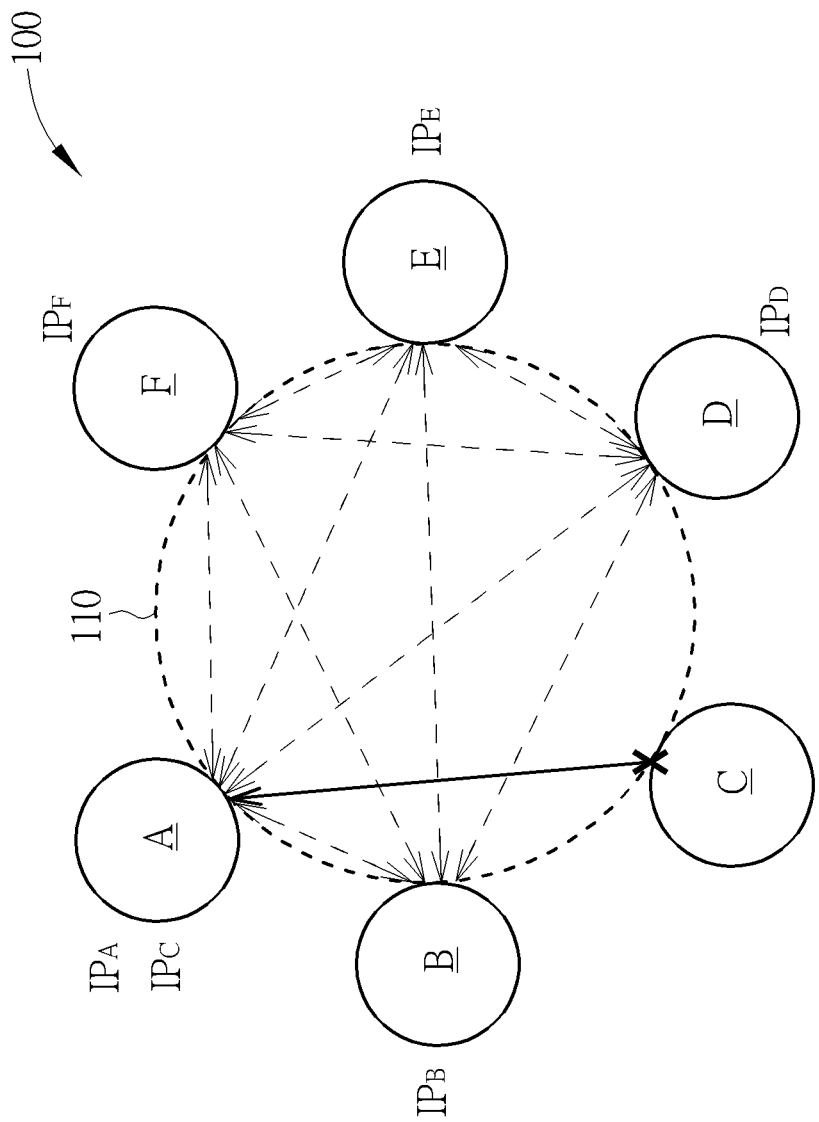
FIG. 3 illustrates a first state of the server cluster.
Figure 4:
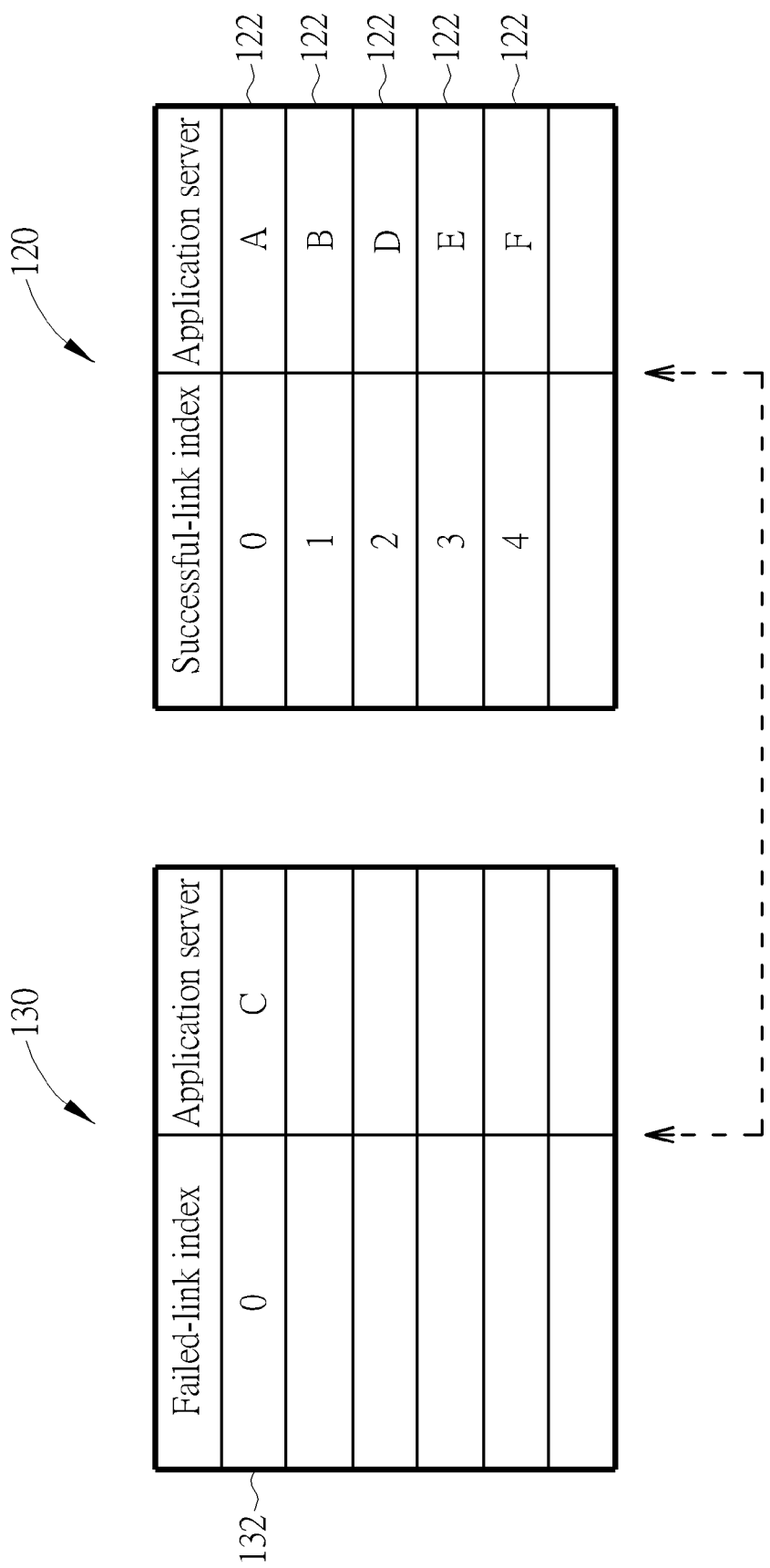
FIG. 4 illustrates the surviving node table and the failed node table of the server cluster in FIG. 3.

Please refer to FIG. 3 and FIG. 4. FIG. 3 is used to describe the process of performing failover on an application server C of server cluster 100. FIG. 4 illustrates the surviving node table 120 and the failed node table 130 of the server cluster 100 in FIG. 3. When performing the failover on the application server C, the right to use of internet protocol address $IP_C$ of the application server C may be transferred to the application server A. The piece of successful link data 122 corresponding to the application server C may be removed from the surviving node table 120 and a failed link data 132 may be created in the failed node table 130 to record the application server C as a failed node. The application server A may use the internet protocol address $IP_A$ and the internet protocol address $IP_C$ to provide the network service already being provided by the application server A and the network service originally provided by the application server C. Furthermore, when the piece of successful link data 122 corresponding to the application server C is removed from the surviving node table 120, the successful-link index of the application server A and B shall not be changed while the successful-link index of the application server D, E, and F shall be changed since the successful-link index of the application server D, E, and F are greater than the successful-link index of the application server C, such that the successful-link index of each of the application server D, E and F is reduced by one. In addition, the failover of the application server C may be performed by one of the surviving application servers A, B, D, E, and F and may be determined according to the successful-link indexes of the surviving application servers A, B, D, E, and F. The application server having the smallest successful-link index may have the priority of performing failover on the failed node. According to FIG. 3 and FIG. 4, the application server A has the smallest successful-link index, therefore the failover of the application server C may be performed by the application server A. Furthermore, when the application server A is performing failover of the application server C, the remaining application servers B, D, E, and F may not perform failover of the application server C. Therefore, no two nodes or above of the server cluster 100 will perform the failover of one failed node to ensure the stability and consistency of the server cluster 100.

Please refer again to FIG. 1 and FIG. 2. In an embodiment of the present invention, each of the plurality of application servers A to F may periodically perform a self-check to determine if they are able to continue providing network service normally. If any one of the plurality of application servers A to F is determined to not be able to normally provide network service after the self-check, the link to the network 110 shall be disconnected. In an embodiment of the present invention, each of the plurality of application servers A to F determines whether links between itself and other application servers are interrupted based on TCP/IP (the Transmission Control Protocol (TCP) and the Internet Protocol (IP)) connections among the application servers A to F. In another embodiment of the present invention, each of the plurality of application servers A to F may periodically send a Packet Internet Groper command (PING command) to other application servers to determine if the connections to other application servers are disconnected. Wherein, any application server that is determined to be disconnected may be viewed as a failed node and any of application servers that is determined to be connected are viewed as surviving node. In this way, each of the plurality of application servers A to F may be able to generate a surviving node table 120 and a failed node table 130. Furthermore, because the process of generating the surviving node table 120 and a failed node table 130 of each of the plurality of application servers A to F is constant, the surviving node table 120 and a failed node table 130 generated by each of the plurality of application servers A to F will be the same.

Figure 5:
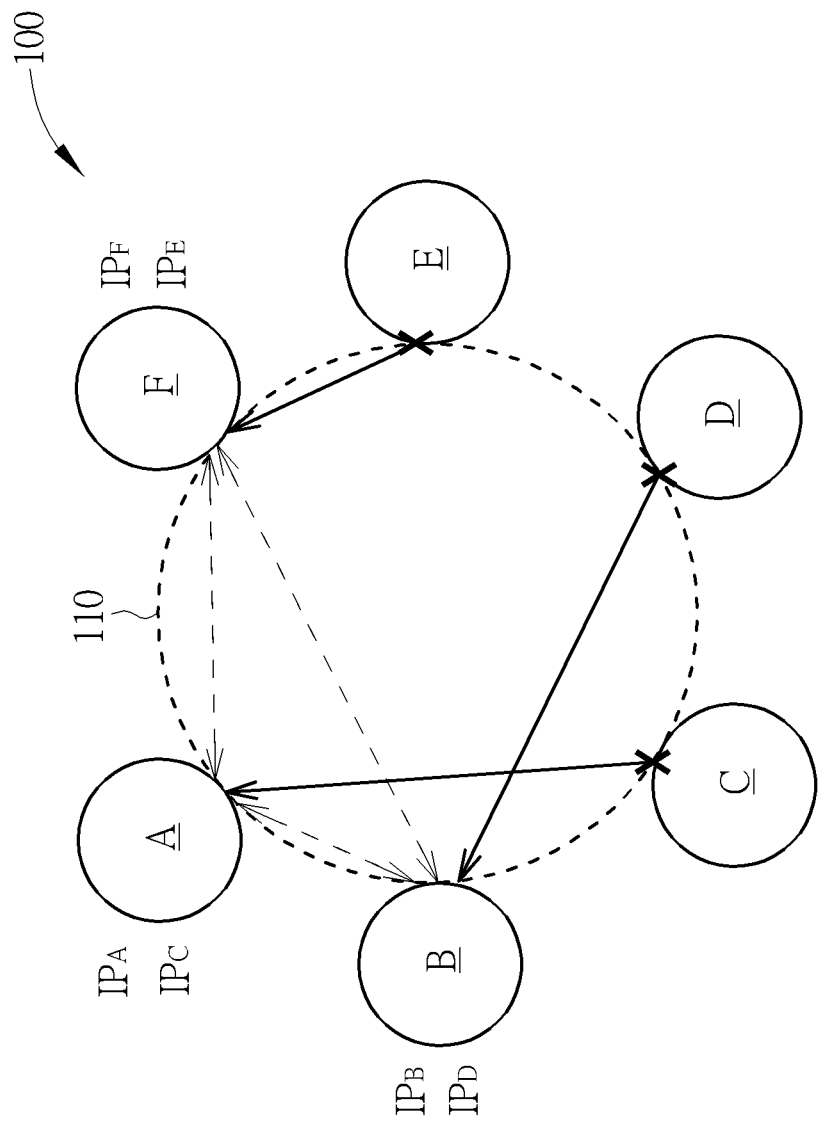
FIG. 5 illustrates a second state of the server cluster.
Figure 6:
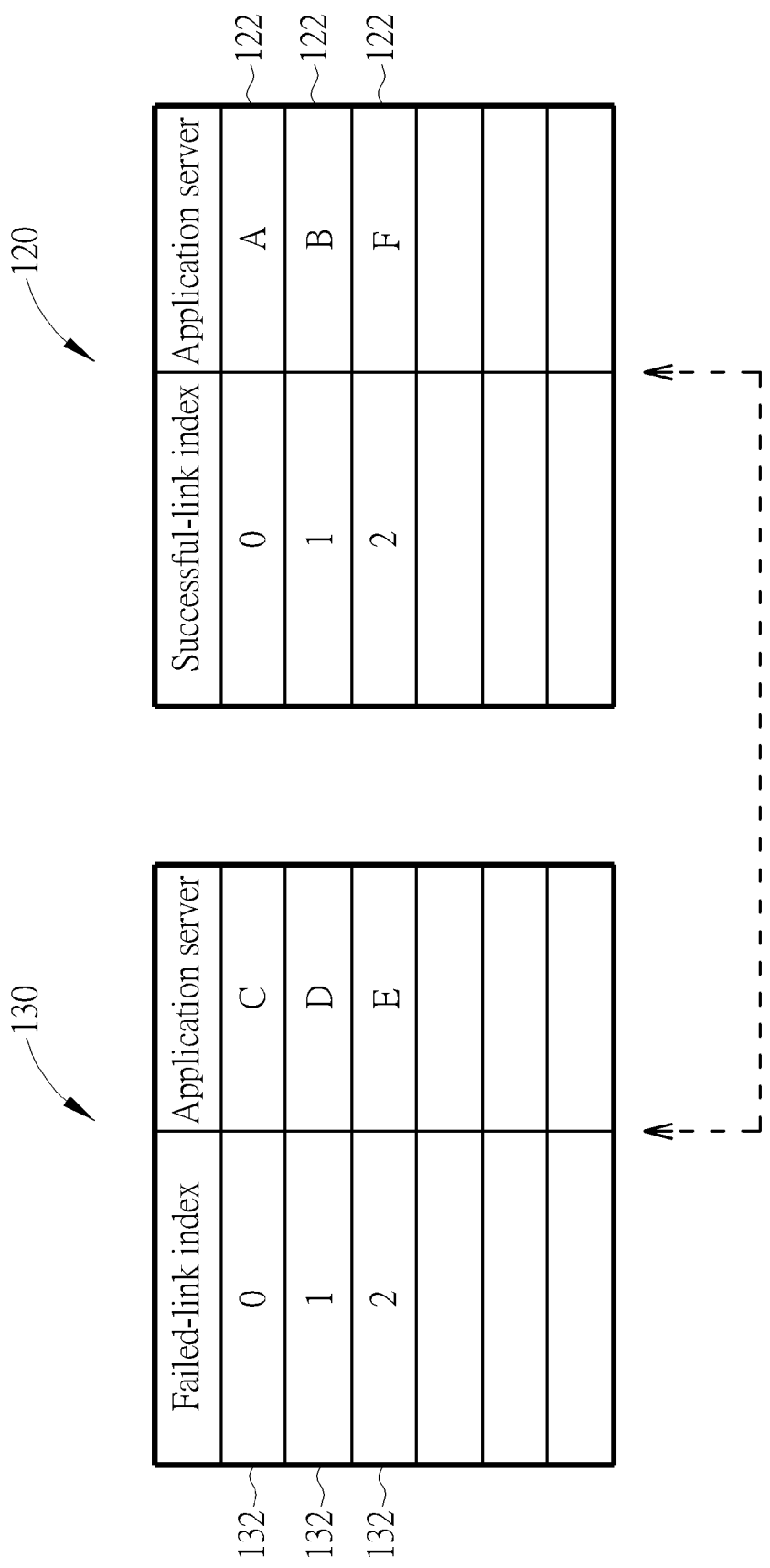
FIG. 6 illustrates the surviving node table and the failed node table of the server cluster in FIG. 5.

Please refer to FIG. 5 and FIG. 6. FIG. 5 illustrates the status when the server cluster 100 having the application servers C, D, and E are converted to failed nodes. FIG. 6 illustrates the surviving node table 120 and the failed node table 130 of the server cluster 100 in FIG. 5. When the surviving node updates the surviving node table 120 and the failed node table 130, the surviving node table 120 of each of the surviving nodes is established according to the sequence of the surviving nodes and the failed node table 130 of each of the failed nodes according to the sequence of the failed nodes. Taking FIG. 5 and FIG. 6 as an example, since the surviving nodes include the application servers A, B, and F having the sequence as A→B→F, the successful-link index of the application servers A, B, and F may be ascending respectively being 0, 1, and 2. Since the failed nodes include the application servers C, D, and E having the sequence as the failed-link index of the application servers C, D, and E may be ascending respectively being 0, 1, and 2. Furthermore, the surviving node assigned to perform failover of respective the failed node is determined according to the following equation:

$$FAILOVER(F_i)=S_{i\ mod\|S\|}$$

where $F_i$ is a node in the failed node table 130 having an failed-link index equal to i, $S_{i mod\|S\|}$ is a node in the surviving node table 120 having an index of surviving link equal to imod$\|S\|$, $\|S\|$ is the number of pieces of successful link data 122 of the surviving node table 120 (i.e. the total number of the surviving node (s)), and imod$\|S\|$ is the remainder of I divided by $\|S\|$. Taking the application server C as an example, the failed-link index is 0, so i=0. Because there are three surviving nodes, $\|S\|$=3, and imod$\|S\|$=0 mod$\|3\|$=0 for the application server C, FAILOVER($F_0$)=$S_{0\ mod\|3\|}$=$S_0$. Therefore, the application server A having an index of surviving link of 0 may perform failover of the application server C. Taking the application server D as an example, the failed-link index is 1, so i=1, imod$\|S\|$=1 for the application server D, FAILOVER($F_1$)=$S_{1\ mod\|3\|}$=$S_1$. Therefore, the application server B having an index of surviving link of 1 may perform failover of the application server D. Taking the application server E as an example, the failed-link index is 2, so i=2, imod$\|S\|$=2 for the application server E, FAILOVER($F_2$)=$S_{2\ mod\|3\|}$=$S_2$. Therefore, the application server F having an index of surviving link of 2 may perform failover of the application server E. Therefore, the internet protocol addresses $IP_C$, $IP_D$, and $IP_E$ of the application servers C, D, and E are transferred respectively to the application servers A, B, and F.

Figure 7:
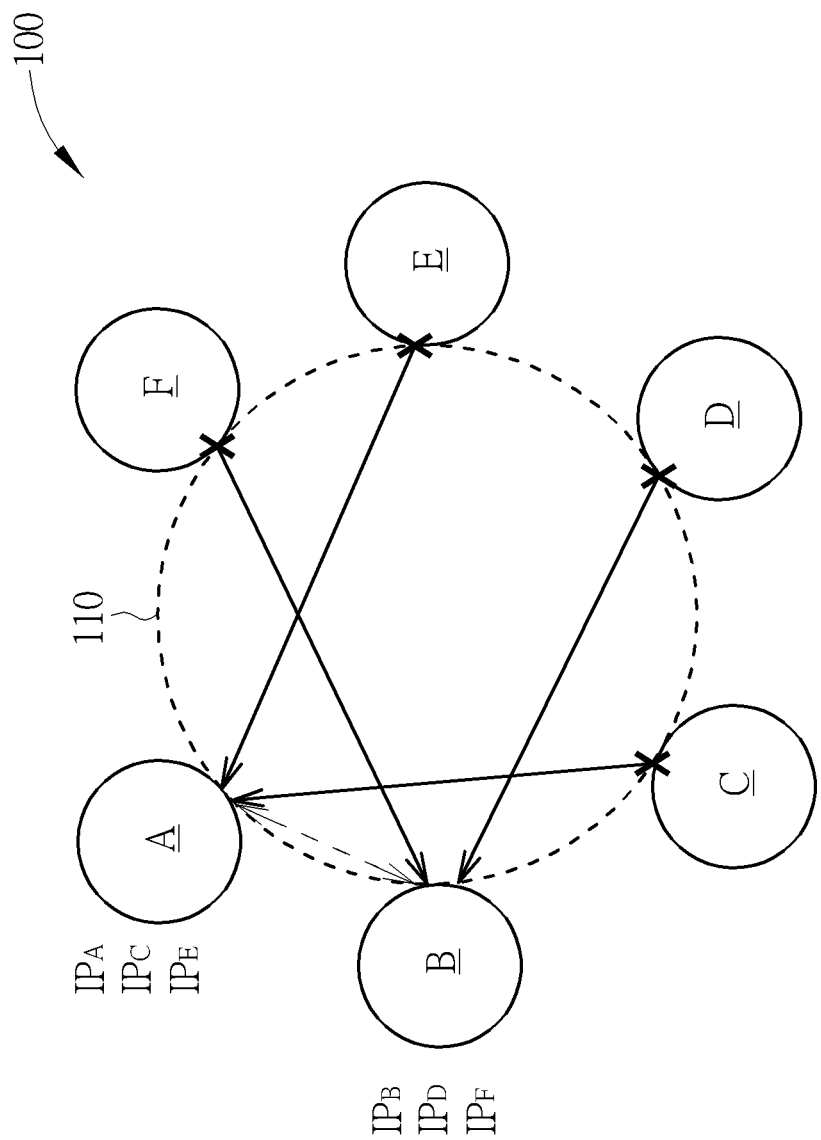
FIG. 7 illustrates a third state of the server cluster.
Figure 8:
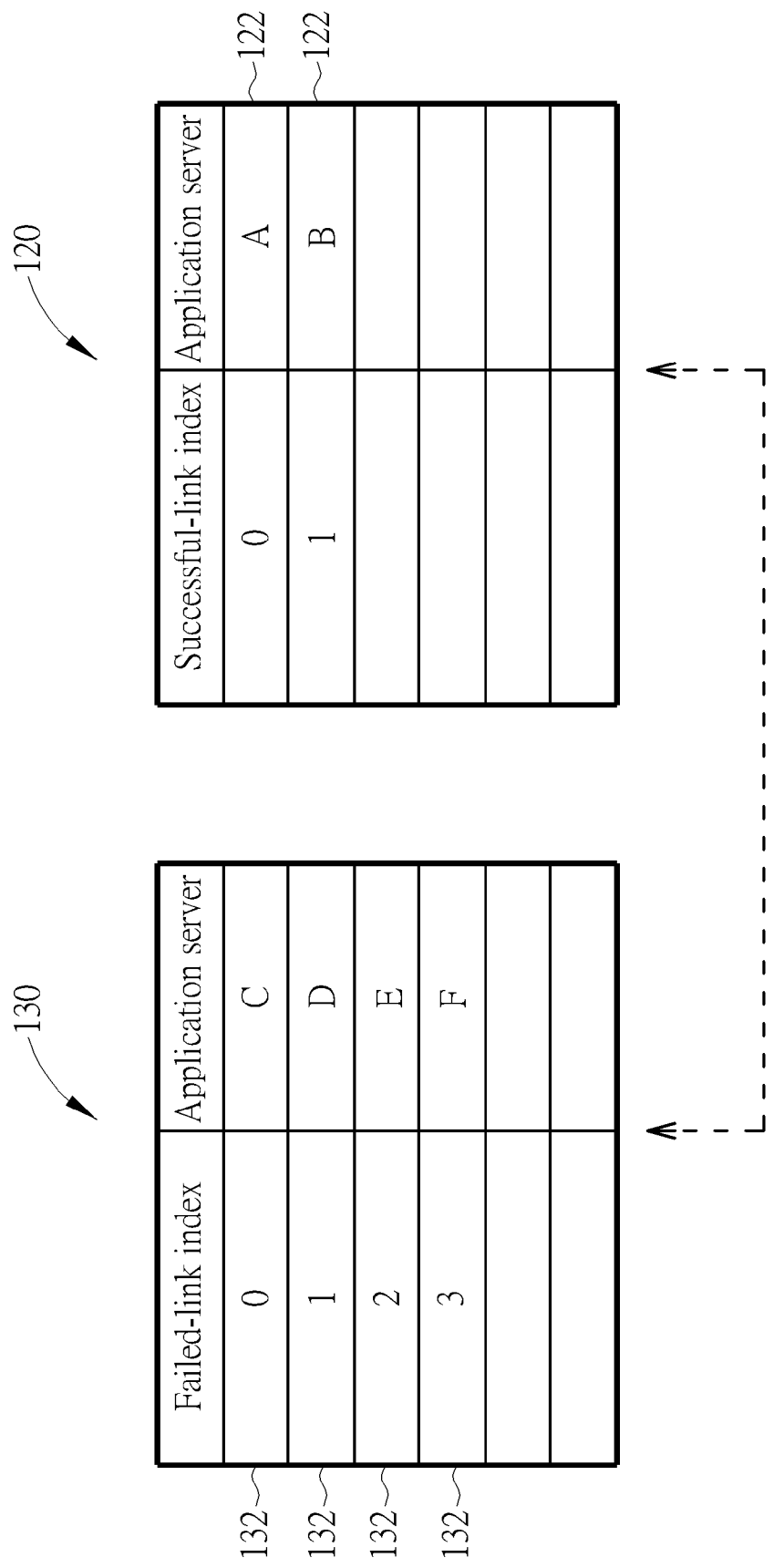
FIG. 8 illustrates the surviving node table and the failed node table of the server cluster in FIG. 7.

Also, FIG. 7 and FIG. 8 are described. FIG. 7 is used to describe a process of the application server F being converted to a failed node while the application servers C, D, and E of the server cluster 100 in FIG. 5 have been failed. FIG. 8 illustrates the surviving node table 120 and the failed node table 130 of the server cluster 100 in FIG. 7. When the surviving node updates the surviving node table 120 and the failed node table 130, since the surviving nodes include the application servers A and B having the sequence as A→B, the successful-link index of the application servers A and B may be ascending respectively being 0 and 1. Since the failed nodes include the application servers C, D, E, and F having the sequence as C→D→E→F, the failed-link index of the application servers C, D, E, and F may be ascending respectively being 0, 1, 2, and 3. After the surviving node table 120 and the failed node table 130 has been updated, the surviving nodes may perform failover for failed nodes including the application servers C, D, E, and F according to the surviving node table 120 and the failed node table 130, as well as the equation FAILOVER($F_i$)=$S_{i mod\|S\|}$. Taking the application server C as an example, the failed-link index is 0, so i=0. Because there are three surviving nodes, $\|S\|$=2, and imod$\|S\|$=0 mod$\|2\|$=0 for the application server C, FAILOVER($F_0$)=$S_{0\ mod\|2\|}$=$S_0$. Therefore, the application server A having an index of surviving link of 0 may perform failover of the application server C. Taking the application server D as an example, the failed-link index is 1, so i=1, imod$\|S\|$=1 for the application server D, FAILOVER($F_1$)=$S_{1\ mod\|2\|}$=$S_1$. Therefore, the application server B having an index of surviving link of 1 may perform failover of the application server D. Taking the application server E as an example, the failed-link index is 2, so i=2, imod$\|S\|$=0 for the application server E, FAILOVER($F_2$)=$S_{2\ mod\|2\|}$=$S_0$. Therefore, the application server A having an index of surviving link of 0 may perform failover of the application server E. Taking the application server F as an example, the failed-link index is 3, so i=3, imod$\|S\|$=1 for the application server F, FAILOVER($F_1$)=$S_{3\ mod\|2\|}$=$S_1$. Therefore, the application server B having an index of surviving link of 1 may perform failover of the application server F. Therefore, the internet protocol addresses $IP_C$ and $IP_E$ of the application servers C and E are transferred to the application servers A, and the internet protocol addresses $IP_D$ and $IP_F$ of the application servers D and F are transferred to the application servers B.

Figure 9:
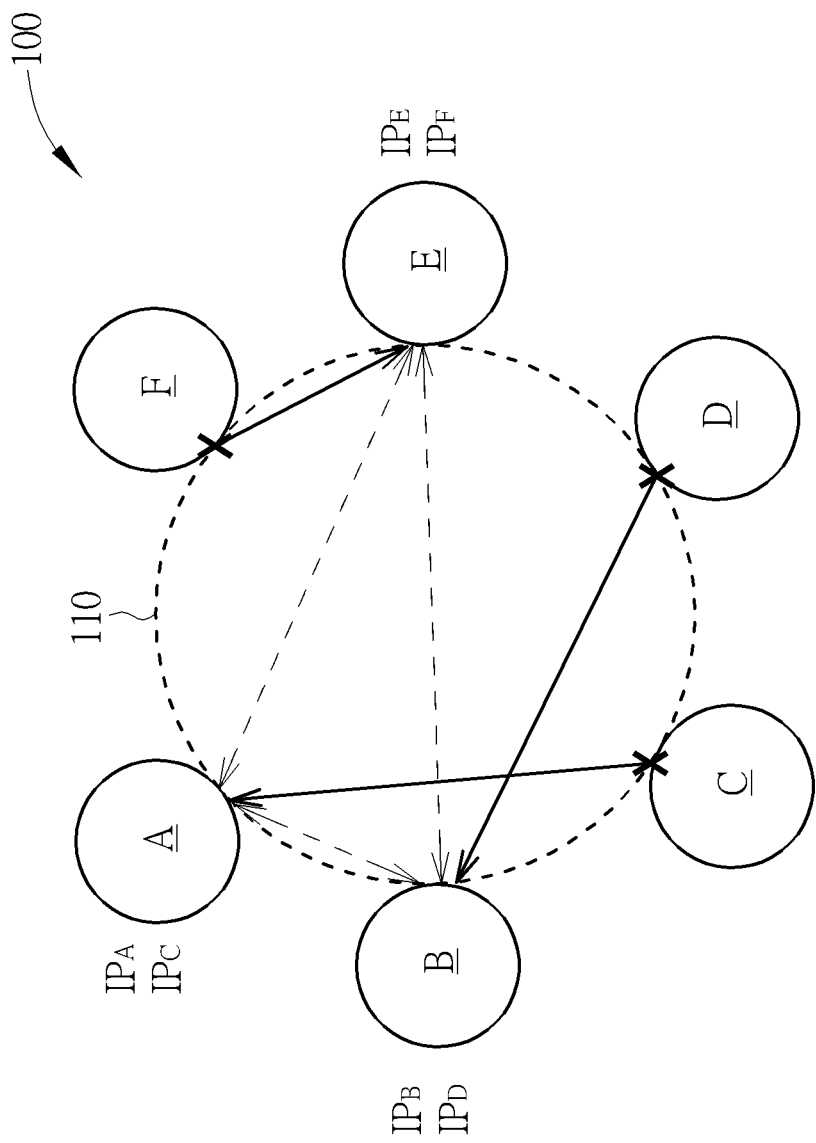
FIG. 9 illustrates a fourth state of the server cluster.
Figure 10:
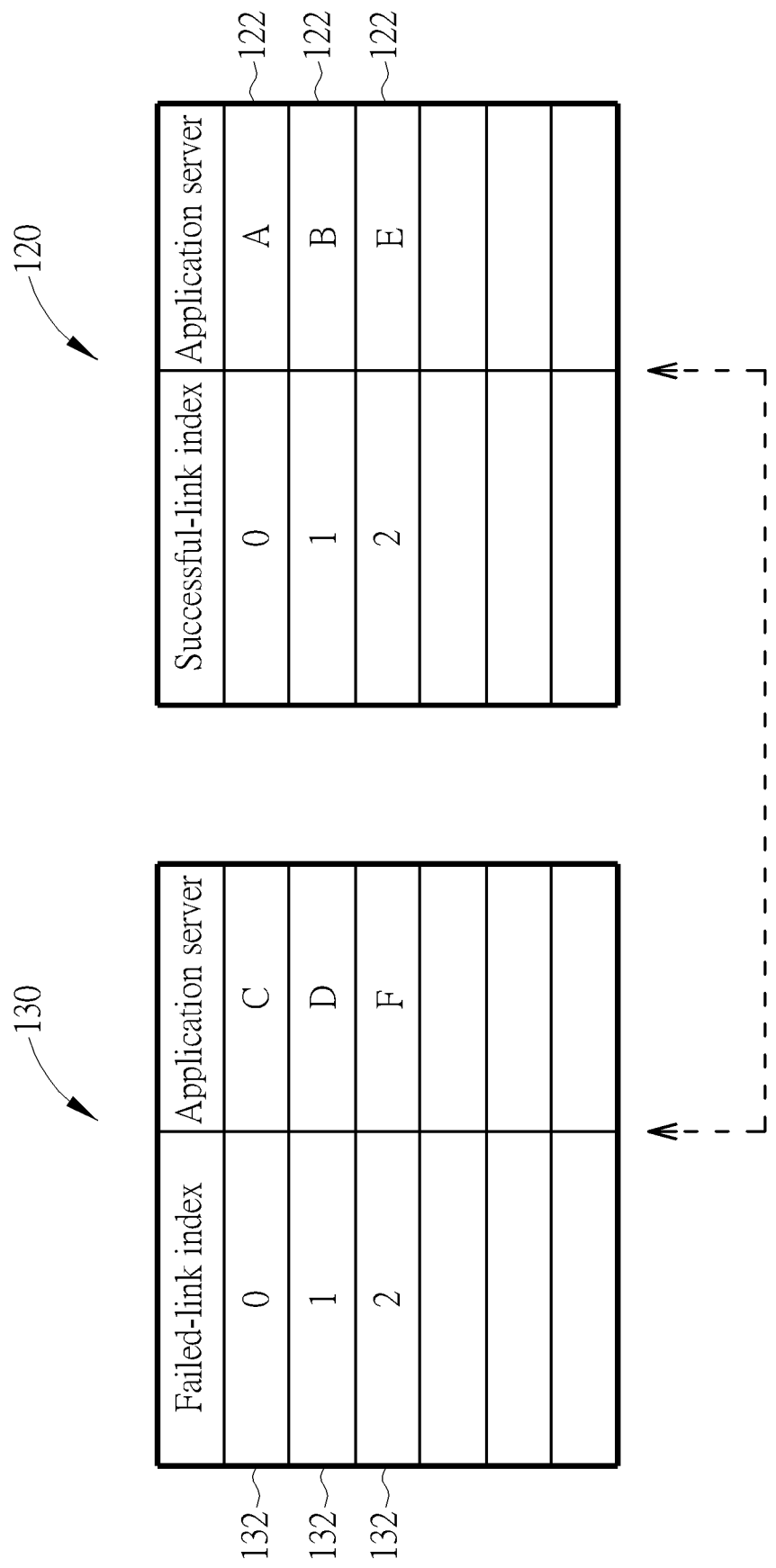
FIG. 10 illustrates the surviving node table and the failed node table of the server cluster in FIG. 9.

Aside from the abovementioned failover operation, the method of the present invention may further comprise failback operation of the application servers. Please refer to FIG. 9 and FIG. 10. FIG. 9 is used to describe the application server E of server cluster 100 in FIG. 7 being converted from a failed node to a surviving node. FIG. 10 illustrates the surviving node table 120 and the failed node table 130 of the server cluster 100 in FIG. 9. When performing failback on the application server E, the link of the application server E to the network 110 may be restored and the right to use of the internet protocol address $IP_E$ is retrieved from the application server A. At this time, the indexes of surviving link of application servers A, B, and E recorded in the surviving node table 120 may respectively be 0, 1, 2 and the failed-link indexes of application servers C, D, and F recorded in the failed node table 130 may respectively be 0, 1, 2.

When the surviving node table 120 and the failed node table 130 are updated, each surviving node may perform failover for failed nodes including the application servers C, D, and F according to the surviving node table 120 and the failed node table 130, as well as the equation FAILOVER ($F_i$)=$S_{i mod\|S\|}$. Taking the application server C as an example, the failed-link index is 0, so i=0. Because there are three surviving nodes, $\|S\|$=3, and imod$\|S\|$=0 mod$\|3\|$=0 for the application server C, FAILOVER($F_0$)=$S_{0\ mod\|3\|}$=$S_0$. Therefore, the application server A having an index of surviving link of 0 may perform failover of the application server C. Taking the application server D as an example, the failed-link index is 1, so i=1, imod$\|S\|$=1 for the application server D, and FAILOVER($F_1$)=$S_{1\ mod\|3\|}$=$S_1$. Therefore, the application server B having an index of surviving link of 1 may perform failover of the application server D. Taking the application server F as an example, the failed-link index is 2, so i=2, imod$\|S\|$=2 for the application server F, and FAILOVER ($F_2$)=$S_{2\ mod\|3\|}$=$S_2$. Therefore, the application server E having an index of surviving link of 2 may perform failover of the application server F. Therefore, the internet protocol addresses $IP_C$, $IP_D$, and $IP_F$ of the application servers C, D, and F are transferred respectively to the application servers A, B, and E.

In summary, according to the embodiment of the present invention, a non-coordinated architecture may be used to perform failover. The failover or failback of each of the application servers may be based on the current status of the server cluster to dynamically balance the loading and avoid excessive loading for a single node. Furthermore, since the surviving node table and the failed node table are produced in one consistent way, no two or more surviving nodes of the server cluster would be assigned to perform the failover of one failed node to ensure the server cluster is stable and consistent.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling operations of a server cluster, the server cluster comprising m application servers, the method comprising:

setting surviving nodes of the m application servers to successful-link indexes of different values;

setting failed nodes of the m application servers to failed-link indexes of different values; and when an $s^{th}$ application server of the m application servers is a failed node and failover is performed on the $s^{th}$ application server, transferring right to use of an internet protocol (IP) address of the $s^{th}$ application server to a $t^{th}$ application server of the m application servers according to a remainder of a failed-link index of the $s^{th}$ application server divided by a number of the surviving nodes and a successful-link index of each of the surviving nodes;

wherein the successful-link index of the $t^{th}$ application server is equal to the remainder; and wherein m>1, m≥s>0, m≥t>0, and m, s, and t are positive integers.

2. The method of claim 1, further comprising:

setting a sequence of the m application servers;

wherein the successful-link index of each of the surviving nodes and a failed-link index of each of the failed nodes are set according to the sequence.

3. The method of claim 2, wherein the sequence is set according to internet protocol addresses of the m application servers.

4. The method of claim 2, wherein the sequence is set according to media access control (MAC) addresses of the m application servers.

5. The method of claim 1, further comprising:

the m application servers issuing Packet Internet Groper (PING) commands to one another so as to individually establish a surviving node table and a failed node table, wherein the surviving node table is used to record each of the successful-link indexes, and the failed node table is used to record each of the failed-link indexes.

6. The method of claim 1, further comprising:

each application server determining whether links between the each application server and other application servers are interrupted based on TCP/IP connections among the m application servers so as to establish a surviving node table and a failed node table of the each application server, wherein the surviving node table is used to record each of the successful-link indexes, and the failed node table is used to record each of the failed-link indexes.

* * * * *